(No Model.)
W. L. SCHLAGER.
CAR COUPLING.
No. 375,460. Patented Dec. 27, 1887.
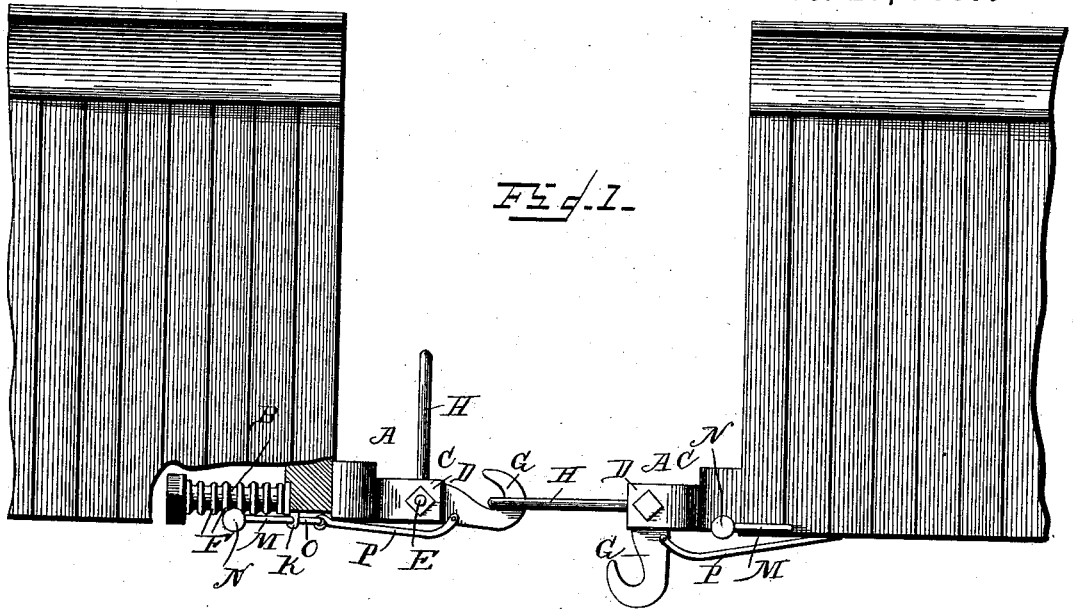
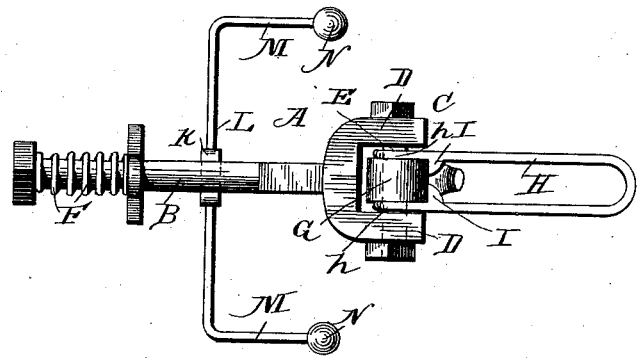
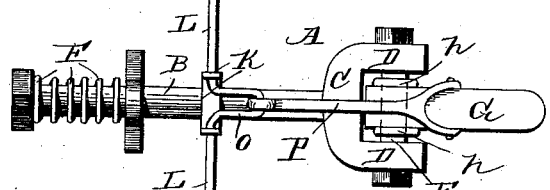
Witnesses
Henry G. Dieterich
C. E. Doyle
Inventor
W. L. Schlager
By his Attorneys

UNITED STATES PATENT OFFICE.

WALTER LINCOLN SCHLAGER, OF MOOSIC, PENNSYLVANIA.

CAR-COUPLING.

SPECIFICATION forming part of Letters Patent No. 375,460, dated December 27, 1887.

Application filed September 23, 1887. Serial No. 250,515. (No model.)

*To all whom it may concern:*

Be it known that I, WALTER LINCOLN SCHLAGER, a citizen of the United States, residing at Moosic, in the county of Lackawanna and State of Pennsylvania, have invented new and useful Improvements in Car-Couplings, of which the following is a specification.

My invention relates to improvements in car-couplings; and it consists in a certain novel construction and arrangement of parts, fully set forth hereinafter, and specifically pointed out in the claims.

In the drawings, Figure 1 is a side view of two of the couplers coupled together. Fig. 2 is a plan view of one of the same. Fig. 3 is a bottom plan view of the same.

Referring by letter to the drawings, A designates the draw-head, comprising the main shank B, and the fork or yoke C at the front end thereof, having the two arms D D. The said arms are provided with aligned openings, through which is passed the bolt E. The rear end of the shank B is rounded, and a spring, F, is coiled thereon in the usual manner to deaden the shock of meeting draw-heads.

G designates the coupling-hook journaled on the bolt E; and H represents the link provided at the rear end with aligned eyes $h\ h$, journaled on the said bolt on opposite sides of the hook. The sides of the said link are provided with inwardly-extending studs or projections I I close to the upper side of the hook, which projections secure the link to the hook, so as to cause them to move simultaneously, only sufficient independent motion being allowed the link to enable a coupling to be made without jar or strain.

K K are bearings on the lower side of the shank B, in which are mounted the transverse bar L, which is provided at the ends with the arms M M, having the weights N N on the ends. The center of the bar is provided between the bearings K K with the U-shaped loop O, extending in the opposite direction from the arms M M, as will be seen by the drawings.

P designates a connecting link or rod, secured at one end to the U-shaped loop and at the other end to the coupling-hook.

It will be seen that if the arms M M are moved the U-shaped loop will be correspondingly moved and the coupling hook will be operated.

The weights on the ends of the arms M M normally hold the latter in the horizontal position, with the end of the loop O pressed against the under side of the shank B, and when the arms are extending toward the rear of the car the link is held in a vertical position and the hook is in the engaging position, as shown in the drawings, Fig. 1, at the left. If the arms M M are extended toward the opposite or coupling car, however, the link is in the horizontal position and the hook is depending, as shown at the right in the figure just referred to. The weights N normally hold the coupler in either of these positions, and the latter cannot be moved from these positions except by manipulating the arms M. The bearings K K, as will be seen, are considerably below the lower side of the shank B, and the weights on the ends of the arms M M cause the end of the U-shaped loop to bear against the lower side of the shank, and therefore it will be readily seen that a lock is thus formed for the coupler.

The operation of the coupler will be readily understood from the foregoing description.

When a coupling is about to be made, one of the couplers is arranged with the link projecting forwardly, and the other coupler is arranged with the hook projecting forwardly, and therefore when the two come in contact the hook engages with the link and forms a very secure coupling. The hook is purposely made much shorter than the link, so that there will be no danger when a coupling is made that the end of the hook will strike against the end of the opposing car. The front end of the hook does not project beyond the bumper on the car and the link of the opposing car is adapted by its length to reach over the said bumper and form the coupling.

It will be seen that this coupler may be readily attached to the ordinary pin-and-link coupler, as it is simply necessary to arrange the link in the horizontal or engaging position, and it acts in the same way as the ordinary coupler.

This coupler may further be connected to a coupler on either a higher or lower level, as well as with one on the same level.

Having thus described my invention, I claim—

1. In a car-coupling, the combination of the draw-head consisting of the shank B, provided at its front end with the fork C, the bolt E, passed transversely through the arms of the fork, the hook G, journaled on the said bolt, the link H, journaled on the said bolt independently of the hook and at right angles thereto, and means for operating the link and the hook, substantially as set forth.

2. In a car-coupling, the combination of the draw-head A, having the shank B and the fork C at the front end thereof, the transverse bolt arranged between the arms of the said fork, the hook G, journaled on the said bolt, the link having the eyes $h\ h$ journaled on the bolt on opposite sides of the hook, and provided with the projections or lugs I I, to engage over the upper side of the hook, whereby the link and hook are adapted to be moved simultaneously, and means, substantially as described, whereby the hook may be rotated on the transverse bolt to throw either the link or the hook into the horizontal position, substantially as and for the purpose specified.

3. In a car-coupling, the combination of the draw-head having the transverse bolt or shaft E arranged at the front end thereof, the hook G, journaled on the said bolt, the link secured to the hook and movable therewith, the transverse bar L, journaled in bearings in rear of the hook and having the U-shaped loop O at the center thereof, arms M M on the ends of the said bar, and the connecting-rod P, attached at opposite ends to the hook G and the U-shaped loop, whereby, when the bar L is operated by means of the handles M, the hook is moved, substantially as and for the purpose specified.

4. In a car-coupling, the combination of the draw-head having the fork C at the front end, bolt or shaft E, secured therein, hook G, journaled on the bolt, the link H, journaled on the bolt and having the projections I I to engage the hook, whereby only a slight independent movement of the link is allowed, the bearings K K on the under side of the draw-head, transverse bar L, journaled therein and having the U-shaped loop O between the said bearings, adapted to bear at the end against the under side of the draw-head, the arms M M on the ends of the bar L, weights N N on the ends of the arms, and the connecting-rod P between the loop O and the hook G, substantially as and for the purpose specified.

5. In a car-coupling, the combination of the transverse bolt or shaft, the coupling-hook journaled thereon, and the link H, journaled on the said bolt on opposite sides of the hook and attached to the hook for simultaneous movement, either the hook or the link being adapted to be arranged in the horizontal or engaging position, substantially as and for the purpose specified.

In testimony that I claim the foregoing as my own I have hereto affixed my signature in presence of two witnesses.

WALTER LINCOLN SCHLAGER.

Witnesses:
 CHAS. LINCOLN MCMILLAN,
 MANFRED P. FRASSONI.